(12) United States Patent
Cottet et al.

(10) Patent No.: US 10,711,643 B2
(45) Date of Patent: Jul. 14, 2020

(54) TURBINE ENGINE WITH AN OIL GUIDING DEVICE AND METHOD FOR DISASSEMBLING THE TURBINE ENGINE

(71) Applicant: SAFRAN AIRCRAFT ENGINES, Paris (FR)

(72) Inventors: Clément Cottet, Melun (FR); Fabrice Michel François René Cretin, La Grande Paroisse (FR); Christophe Paul Jacquemard, Hericy (FR); Christophe Marcel Lucien Perdrigeon, Ballainvilliers (FR); Leny Toribio, Bayonne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 173 days.

(21) Appl. No.: 15/686,622

(22) Filed: Aug. 25, 2017

(65) Prior Publication Data

US 2018/0058260 A1    Mar. 1, 2018

(30) Foreign Application Priority Data

Aug. 26, 2016 (FR) ...................... 16 57977

(51) Int. Cl.
*F01D 25/18* (2006.01)
*B64C 11/06* (2006.01)
(Continued)

(52) U.S. Cl.
CPC .............. *F01D 25/18* (2013.01); *B64C 11/06* (2013.01); *B64C 11/32* (2013.01); *B64D 27/10* (2013.01);
(Continued)

(58) Field of Classification Search
CPC ......... F01D 25/18; B64C 11/06; B64C 11/32; B64D 27/10; B64D 2027/005; F05D 2220/323; F05D 2230/70; Y02T 50/66
See application file for complete search history.

(56) References Cited

U.S. PATENT DOCUMENTS 2,438,542 A * 3/1948 Cushman ................ B64C 11/06
416/147
5,152,668 A * 10/1992 Bulman .................. B64C 11/32
416/129
(Continued)

FOREIGN PATENT DOCUMENTS

FR      3 010 728 A1    3/2015
WO    2013/050704 A1    4/2013

OTHER PUBLICATIONS

Preliminary Search Report and Written Opinion of the Institut National de la Propriété Industrielle completed May 16, 2017, in corresponding French Application No. 1657977, filed Aug. 26, 2016, 7 pages.

*Primary Examiner* — David E Sosnowski
*Assistant Examiner* — Eric J Zamora Alvarez
(74) *Attorney, Agent, or Firm* — Christensen O'Connor Johnson Kindness PLLC

(57) ABSTRACT

A turbine engine is provided with a longitudinal rotation axis having at least one shaft with a radial axis, in particular a pitch change system for the blades of a propeller, said shaft traversing a radial passage of a substantially cylindrical case around the longitudinal axis. The turbine engine includes an annular oil guiding device around the radial shaft. The device has first and second annular parts nested in one another and secured to one another by hooping. The first part is secured by hooping to the radial shaft, and the second part is configured so as to be separated from the first part under the action of a force oriented along the radial axis and (Continued)

exerted on the second part by a member of the turbine engine forming a stop during a radial movement of the radial shaft.

10 Claims, 5 Drawing Sheets

(51) Int. Cl.
  *B64D 27/10* (2006.01)
  *B64C 11/32* (2006.01)
  *B64D 27/00* (2006.01)
(52) U.S. Cl.
  CPC .. *B64D 2027/005* (2013.01); *F05D 2220/323* (2013.01); *F05D 2230/70* (2013.01); *Y02T 50/66* (2013.01)

(56) References Cited

U.S. PATENT DOCUMENTS

| | | | |
|---|---|---|---|
| 2008/0279689 A1 | 11/2008 | Sebald | |
| 2014/0294585 A1 | 10/2014 | Escure et al. | |
| 2015/0078899 A1* | 3/2015 | Belmonte | B64C 11/06 416/147 |
| 2016/0333709 A1* | 11/2016 | Belmonte | F02K 3/072 |

* cited by examiner

TURBINE ENGINE WITH AN OIL GUIDING DEVICE AND METHOD FOR DISASSEMBLING THE TURBINE ENGINE

FIELD OF THE INVENTION

The present disclosure relates to the field of aeronautic propulsion. It more particularly relates to a turbine engine comprising an oil guiding device arranged around the shaft, in particular a pitch change system for a propeller, and the method for disassembling this turbine engine.

BACKGROUND

The change of pitch or variable setting of blades of a turbine engine propeller is one way for improving the performance and output of turbine engines under different flight conditions.

It is known turbine engine such as turboprops, for example with pairs of despun propellers, referred to by the expressions "open rotor" and "unducted fan", equipped with these pitch change systems are known. Turboprops differ from turbojet engines by the use of a propeller outside the nacelle (unducted) instead of a fan. The pitch change system may also apply to a turboprop with a propeller or adapt indifferently to several propellers.

In a turboprop of the open rotor type, a gas-generating part and a propulsion part are aligned and arranged in a stationary cylindrical nacelle supported by the structure of the aircraft. The gas-generating part can be arranged upstream or downstream from the propulsion part. The terms "upstream" and "downstream" are defined relative to the circulation of the gases in the turbine engine. The propulsion part includes a pair of coaxial and despun propellers, upstream and downstream, respectively, that are rotated in opposite directions relative to one another by a turbine, in particular a low-pressure turbine, of the gas-generating part via a reduction gear, for example an epicyclic gear set. The propellers extend substantially radially across from the transmission shaft with a longitudinal axis to the outside the nacelle. In general, each propeller comprises a substantially cylindrical rotary case bearing an outer polygonal hub received rotatably around the longitudinal axis in the stationary nacelle. The hub includes radial cylindrical housings distributed on its periphery around the longitudinal axis. Shafts with radial axes, perpendicular to the longitudinal axis of the turbine engine, secured to roots of the blades, are received in the housings of the polygonal rings and also traverse radial passages of the cylindrical case. Rotational guide bearings housed in these radial passages keep the radial shafts in their passages.

An example system for changing the pitch of each propeller is known from document WO2013/050704. In FIG. 2, this pitch change system 23A is installed in the core of the rotary parts, for example with an annular control cylinder 25A rotating the roots of the blades. The annular control cylinder 25A includes a cylinder 27A mounted on a stationary case 13A and a piston 29A connected to a connecting mechanism 26A that is connected to each shaft 47A having a radial axis. A cylindrical rotary case 11A rotates around the stationary case. To that end, at least one bearing 12A is arranged between the stationary case 13A and the rotary case 11A. The system further comprises a load transfer bearing 34A whereof the inner ring is secured to the piston 29A and the outer ring is connected to the connecting mechanism 26A and lubricating means for said bearing 34A. The movement of the piston following the fluid command of the annular control cylinder 25A ensures the desired angular pivoting of the blades by the connecting mechanism 26A by pivoting the radial shafts 47A connected to the blades. The radial shafts 47A convert the force generated by the annular control cylinder 25A into a torque directly on the module of the propeller. These shafts 47A traverse the rotating parts, on the same occasion traverse at least one ventilation duct 22A, a primary air duct 20A in which hot air circulates and a lubricant oil enclosure 23A in which the oil that made it possible to lubricate the load transfer bearing 34A propagates, under the effect of the rotation thereof, in the form of mist or droplets of oil. This oil enclosure 23A is situated near the primary air ducts 20A and zones with a high temperature gradient.

Sealing problems may arise at the passage of the radial shaft due to the forces applied on the rotary part and, in particular, the movements of the radial shafts during the movement of the pitch change system of the blades. These forces are multiplied when the control cylinder is such that it plays a structural role. The radial shafts 47A can thus move radially and axially in the rotary part.

It is therefore known, as shown in FIG. 3, to use annular sealing means 10A between the radial shaft 47A and a peripheral edge 35A of the passage of the rotary case 11A to limit, or even avoid, the risks of pollution or oil leakage. However, some sealing means are not effective, since they do not accept the radial movements of the radial shaft. Thus, the ventilation duct 22A, traversed by the radial shaft 47A, can be polluted due to the oil stored in the oil enclosure 23A and able to penetrate the ventilation duct due to the movements of the radial shaft. The sealing means 10A can also break, causing oil leaks that may lead to a fire in the turbine engine, in light of the substantial heat of this environment. It is also known to use an oil deflector 11A in case of failure of the sealing means. However, the integration of the deflector on the radial shaft in such a cluttered zone is problematic in terms of the disassembly of the radial shaft, since this would involve using the oil deflector to remove the rotational guide bearings 15A of the radial shaft or the destruction of the deflector.

SUMMARY

The present invention for example aims to provide a turbine engine comprising an oil guiding device making it possible to reduce the sizing and integration constraints of such an oil guiding device on a radial shaft arranged in a cluttered environment, while allowing easier assembly and disassembly of the radial shaft, in particular of a pitch change system for the blades of a propeller.

This aim is achieved, according to the invention, with a turbine engine provided with a longitudinal rotation axis and comprising at least one shaft with a radial axis, in particular a pitch change system for blades of a propeller, said shaft traversing a radial passage of a substantially cylindrical case extending around the longitudinal axis, the turbine engine comprising an annular oil guiding device that extends around the radial shaft, said device comprising a first annular part and a second annular part nested in one another and secured to one another by hooping, the first part being secured by hooping to the radial shaft and the second part being configured so as to be separated from the first part by the action of a force oriented along the radial axis and exerted on the second part by a member of the turbine engine forming a stop during a radial movement of the radial shaft.

Thus, this solution makes it possible to achieve the aforementioned aim. In particular, the configuration of the annular oil guiding device makes it possible, on the one hand, to integrate it on the radial shaft in a limited space already very cluttered by many elements arranged at the periphery of the radial shaft, and on the other hand, to unhoop the second part without tools in this environment with limited accessibility. This also makes it possible to maintain the integrity of the annular oil guiding device as well as the integrity of the surrounding elements.

According to another feature of the invention, the first part passes through the member of the turbine engine, the inner diameter of the member of the turbine engine being substantially larger than the outer diameter of the first part. In this way, the second part being separated from the first part, the latter can pass through the central opening of the member of the turbine engine so as to allow the removal of the radial shaft from the radial passage of the case without any obstacles.

According to another feature of the invention, the first part comprises a cylindrical support step extending in a plane substantially perpendicular to the radial axis, said cylindrical support step at least partly supporting the second part so as to block the movement of the second part along the radial axis toward the longitudinal axis.

According to another feature of the invention, the first part includes an outer cylindrical face in contact with an inner cylindrical surface of the second part. This inner cylindrical surface and this outer cylindrical face create a hooping zone.

According to another feature of the invention, the first part and the second part include at least two disassembly bevels that are oriented across from one another so as to facilitate the disassembly of the annular oil guiding device.

According to still another feature of the invention, the turbine engine comprises a rotational guide bearing of the radial shaft keeping the radial shaft in said passage, the bearing including an inner ring secured by hooping to the radial shaft and an outer ring secured to the cylindrical case, the outer ring forming the member of the turbine engine that applies the force on the second part of the device.

Advantageously, but non-limitingly, the guide bearing is a smooth bearing.

According to another feature of the invention, the annular oil guiding device is mounted radially at least partly between sealing means and the member of the turbine engine, and the second part of the device has an inner diameter that is substantially larger than the outer diameter of a first element of the sealing means. Such a configuration makes it possible for the first part and the first sealing element to pass through the central opening of the second part and also through the central opening of the outer ring of the rotational guide bearing so as to allow the removal of the radial shaft from the passage with no obstacles.

Advantageously, but non-limitingly, the sealing means are arranged between the radial shaft and a peripheral edge of the radial shaft of the cylindrical case.

According to one feature of the invention, the outer ring comprises an upper edge, at least part of which is arranged across from a lower surface of the second part.

According to another feature of the invention, the second part comprises an annular rim extending radially outward relative to the longitudinal axis and at least part of which is across from an outer cylindrical surface of a cylindrical rim of the peripheral edge so as to cap said rim and protect the sealing means.

According to still another feature of the invention, the first element of the sealing means is an open annular segment surrounding said shaft with a radial axis and mounted sliding in a plane substantially perpendicular to the radial axis, the annular segment being constrained in said plane and cooperating with an inner cylindrical surface of said peripheral edge. Such a configuration of the sealing means makes it possible on the one hand to withstand the radial forces experienced by the shaft with a radial axis in particular, and on the other hand a constant contact of the annular segment with the inner cylindrical surface of the peripheral edge, which guarantees effective and lasting sealing within the turbine engine. Added to this is the fact that the annular segment is adapted to an environment dirtied with oil and at a very high temperature, unlike other sealing means of the prior art.

According to still another feature of the invention, the first part comprises an upper cylindrical step forming an abutment, the upper cylindrical step being intended to support the sealing means.

Advantageously, but non-limitingly, the first part is made from a metal material having a thermal expansion coefficient higher than that of the metal material of the second part. This makes it possible to reinforce the hooping between the first part and the second part during the operation of the turbine engine.

In particular, the first part is made from Inconel® and the second part is made from stainless steel of type 17-4 PH. This difference in materials thus allows the first part to expand more than the second part, which causes tightening of the hooping and makes it possible to lock the connection between the first and second parts during the operation of the turbine engine.

According to still another feature of the invention, the turbine engine comprises a pitch change system for blades of a propeller including a connecting mechanism connected to each blade of the propeller via the shaft with a radial axis and a control means acting on the connecting mechanism.

Advantageously, but non-limitingly, the control means comprises an actuator, the moving body of which slides around a cylindrical wall of a stationary case relative to the cylindrical case. In particular, the actuator comprises an annular control cylinder.

The invention also relates to a method for disassembling a turbine engine according to any one of the aforementioned features. According to the method, during the disassembly of the radial shaft, the method comprises the following steps:
  moving the radial shaft radially with respect to the longitudinal axis so as to remove the first part of the annular oil guiding device at the same time;
  causing, at the same time as the movement of the radial shaft, the separation of the second part from the first part under the action of a force oriented along the radial axis and exerted on the second part by a member of the turbine engine; and
  removing said member of the turbine engine from the passage.

Thus, first separating the second part via a member of the turbine engine makes it possible on the one hand to adapt to the restrictive and hard-to-access environment, and on the other hand, to allow the integrity of the second part. Secondly, the member of the turbine engine is removed so as to maintain the integrity of this member.

According to one feature of this method, the member of the turbine engine is an outer ring of a rotational guide bearing secured to the cylindrical case.

The invention may also relate to a turbine engine with a longitudinal rotation axis comprising:
  at least one shaft with a radial axis, in particular a pitch change system for the blades of a propeller, said shaft with a radial axis traversing a radial passage of a substantially cylindrical case around the longitudinal axis; and sealing means arranged between the shaft with a radial axis and a peripheral edge of said passage, the sealing means comprising at least one open annular segment surrounding said shaft with a radial axis and mounted so as to be able to slide in a plane substantially perpendicular to the radial axis, the annular segment being constrained in said plane and a face of which cooperates with an inner cylindrical surface of said peripheral edge.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
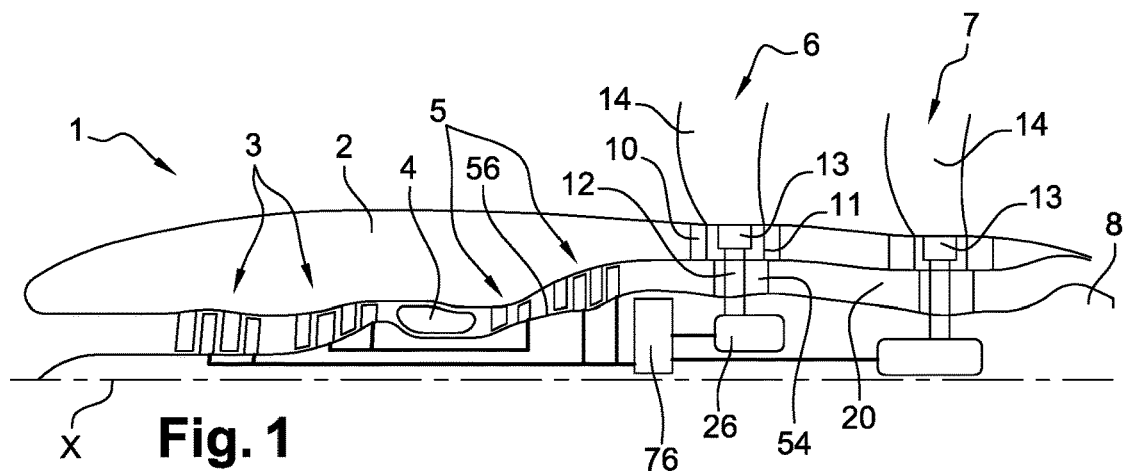
FIG. 1 is an axial sectional schematic view of a representative embodiment of a turbine engine with a system for changing the pitch of blades of a propeller according to the present disclosure.
Figure 2:
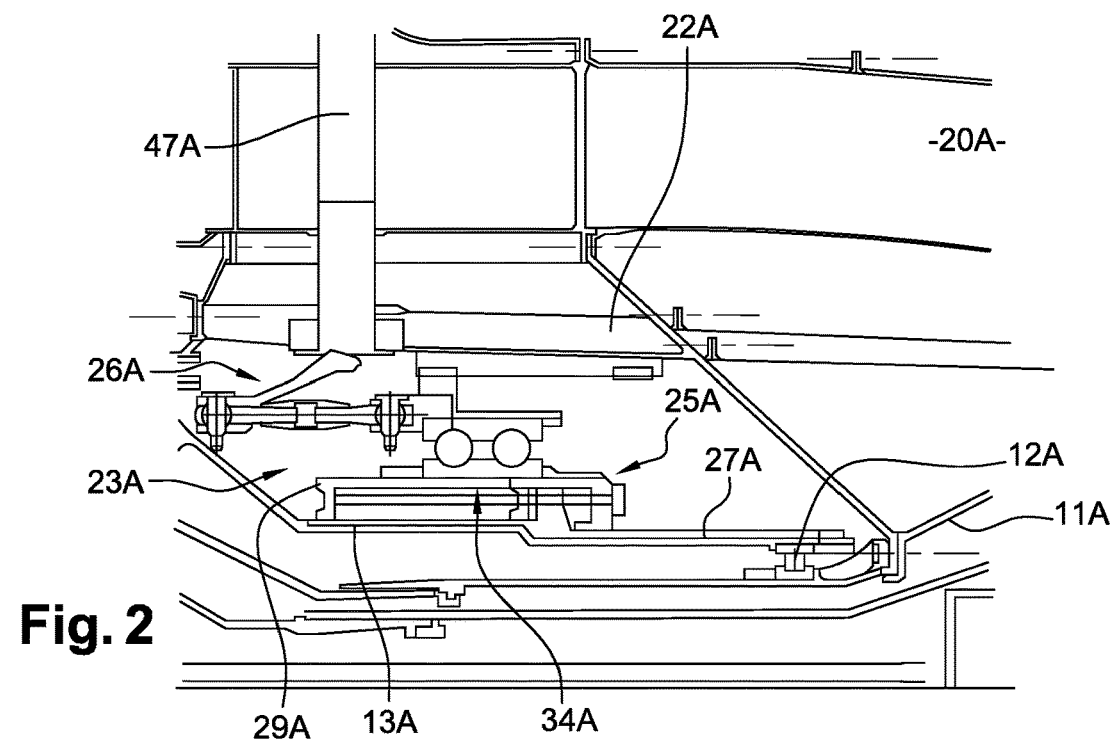
FIG. 2 is an example system for changing the pitch of blades of a propeller according to an example of the prior art.
Figure 3:
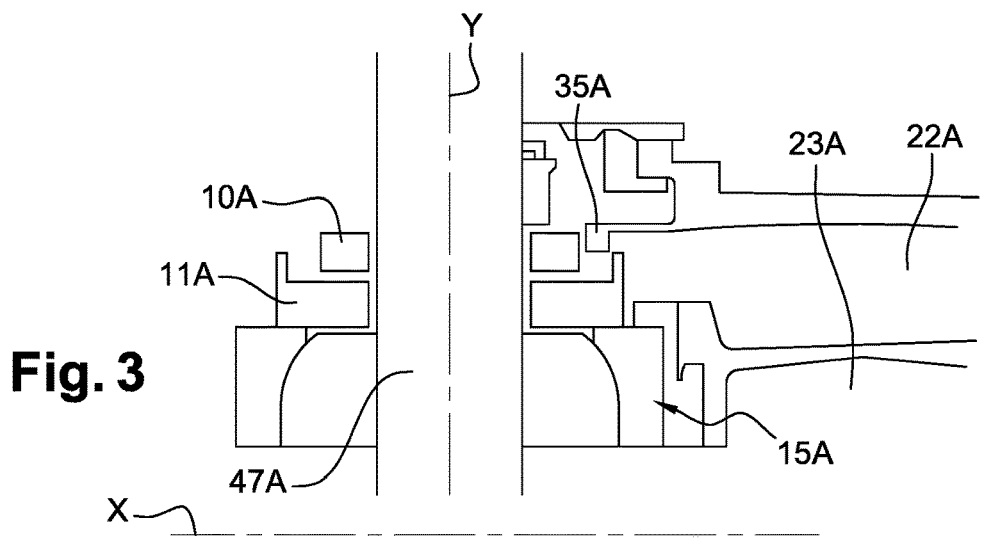
FIG. 3 is an example installation of sealing means and an oil deflector on a radial shaft of a pitch change system according to one example of the prior art.

In FIG. 1 and the rest of the description, a turbine engine such as a turboprop with an unducted fan intended to equip an aircraft is shown. However, the invention may apply to other types of turbine engine.

The turbine engine 1 comprises a nacelle 2 in which a gas generator is arranged that comprises, from upstream to downstream, a set of compressors 3, a combustion chamber 4 and a set of turbines 5. A jet nozzle 8 is arranged downstream from the gas generator.

In the present invention, and in general, the terms "upstream" and "downstream" are defined relative to the circulation of the gases in the turbine engine.

The set of compressors 3 may comprise one or two compressor(s), depending on the gas generator architecture with one or two stages. The set of turbines 5 may comprise a high-pressure turbine and a low-pressure turbine, or two (high-pressure and intermediate-pressure) turbines and a low-pressure turbine. The gas generator drives the low-pressure turbine around a rotor shaft having a longitudinal axis X.

The turbine engine comprises a pair of despun propellers with an upstream propeller 6 and a downstream propeller 7. These two upstream 6 and downstream 7 propellers are contra-rotated by the low-pressure turbine via a mechanical transmission device 76. The upstream 6 and downstream 7 propellers are assembled coaxially to the longitudinal axis X of the turbine engine 1 and are arranged in parallel radial planes, which are perpendicular to the longitudinal axis X. In the present example, the propellers 6, 7 are mounted downstream from the gas generator. The mechanical transmission device 76, shown here schematically, may comprise a differential reduction gear or an epicyclic gear set. It is of course possible to drive the upstream 6 and downstream 7 propellers directly via the low-pressure turbine.

According to the configuration described above, the stream of air entering the turbine engine is compressed in the set of compressors 3, then mixed with fuel and burned in the combustion chamber 4. The created combustion gases next enter the turbines 5 to drive, via the mechanical transmission device 76, the propellers 6, 7 in reverse rotation, providing the majority of the thrust. The combustion gases are expelled through the jet nozzle 8 participating in the thrust of the turbine engine 1. The gases traverse a primary gas flow duct 20 extending substantially axially in the turbine engine between the nacelle 2 and a median case 56 associated with the gas generator.

Figure 4:
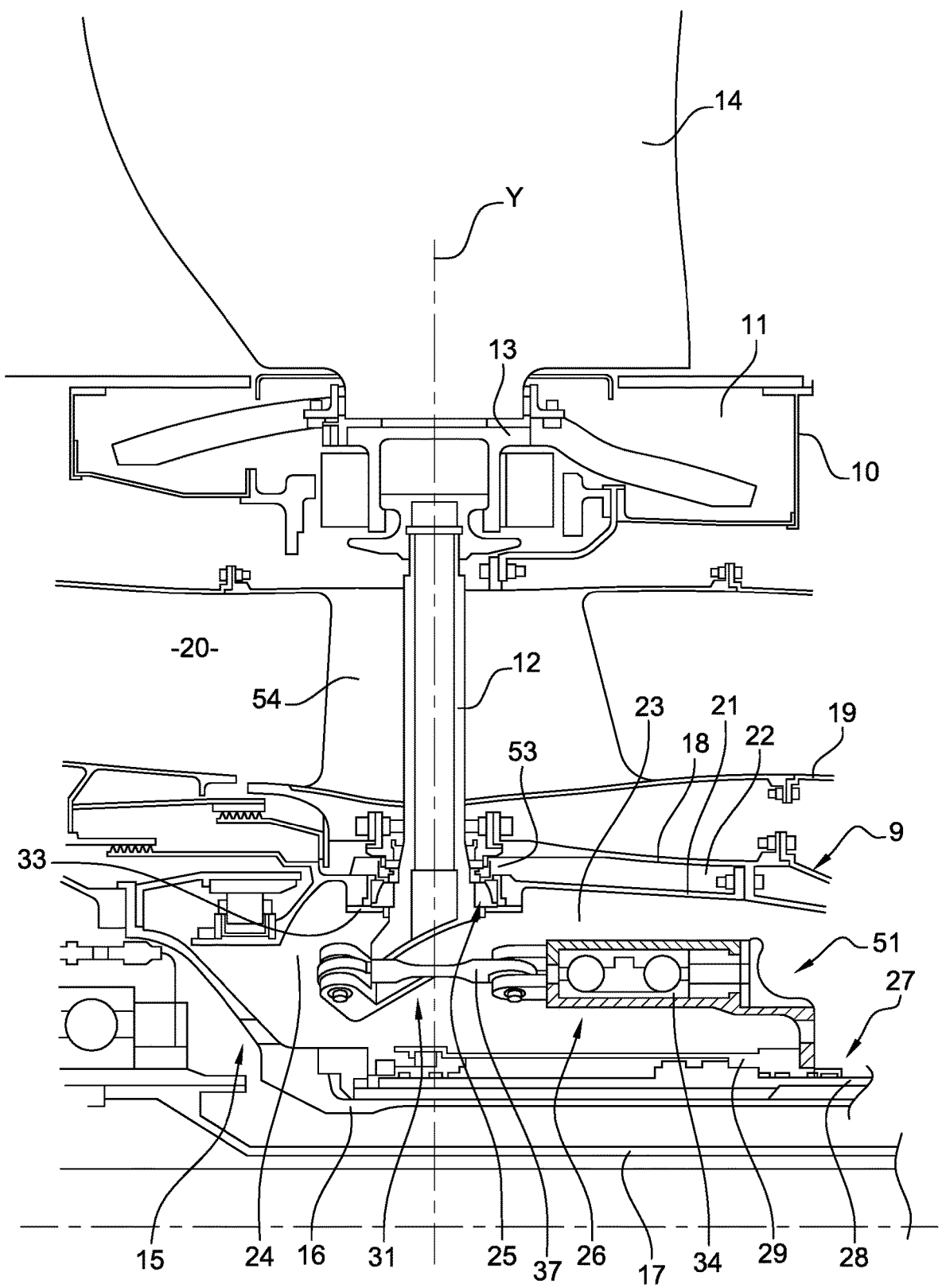
FIG. 4 is a partial axial sectional detail view of a shaft with a radial axis and a pitch change system for blades of a turbine engine according to the present disclosure.

FIG. 4 shows a case 9, here cylindrical, mounted rotating with respect to the nacelle 2 of the turbine engine around a rotor shaft with longitudinal axis X. The case 9 is also connected to a corresponding part of the mechanical transmission device. This cylindrical rotary case 9 or rotor case comprises several skins or walls of revolution, including at least one outer wall 18 relative to a radial axis Y, here perpendicular to the longitudinal axis X. In the rest of the description, the terms "top", "bottom", "upper" and "lower" are defined relative to the radial axis Y in light of the separation relative to the longitudinal axis X. The outer wall 18 defines, with a flange 21, an annular ventilation duct 22. An annular oil enclosure 23 also formed by the flange 21 is situated radially below the ventilation duct 22. The case 9 comprises radial housings 11 and radial passages 53 that are coaxial and that are each traversed by a shaft 12 with radial axis Y, hereinafter radial shaft 12, connected to a root 13 of a blade 14 of the corresponding propeller 6, 7. The blades 14 extend radially outside the nacelle 2. In particular, the case 9 comprises a polygonal ring 10, provided with radial housings 11, here cylindrical, regularly distributed over its periphery. The housings 11 receive the root 13 of the blades 14. The outer wall 18 comprises the radial passages 53, here cylindrical, regularly distributed over its periphery and traversed by the radial shafts 12. The latter extend radially through a structural arm 54 connecting the polygonal ring 10 to a radially inner skin 19 of the case 9. This radially inner skin 19 is downstream from the median case 56 (shown in FIG. 1). It forms part of the wall of the primary gas flow duct 20.

Each radial shaft 12 is connected to a connecting mechanism 31 of a system 26 for changing the pitch of the blades 14 of the propeller 6 making it possible to vary the setting or the pitch of the blades 14 around the radial axis Y such that they occupy angular positions according to the operating conditions of the turbine engine and the flight phases in question. The pitch change system 26 is arranged in an annular space 24 formed by the outer wall 18 and a radially opposite inner wall 17 of the case 9. More specifically, the pitch change system 26 is arranged radially between a cylindrical wall 16 of a stationary case 15 or stator case and the outer wall 18 of the case 9. The cylindrical wall 16 extends axially between the inner wall 17 and the outer wall 18 of the case 9. The stationary case 15 and the cylindrical case 9 are coaxial. The pitch change system 26 comprises a control means 27 connected to the connecting mechanism 31 and controlling the pitch change of each of the blades 14. The control means 27 comprises an actuator that includes a stationary body 28 and a body 29 translatable relative to the stationary body 28 along the axis X. The connecting mechanism 31 is arranged around the actuator. The latter is arranged so as to move the connecting mechanism 31 axially, which is connected to the radial shafts 12 of the blade root such that the axial movement of the connecting mechanism 31 causes the pitch change of the blades. The radial shafts 12 pivot around the axis Y in the radial passages 53 and radial housings 11. In particular, the pitch change system 26 comprises a load transfer module 51 comprising a load transfer bearing 34 that is arranged between the connecting mechanism 31 and the moving body 29 so as to transmit the axial forces exerted by the moving body 29 of the actuator.

The connecting mechanism 31 further comprises a set of articulated connecting rods 37 that are distributed regularly around the actuator and that are intended to act on the root of the blades 14 via the radial shafts 12 to rotate them around their axis Y. There are as many connecting rods 37 as there are blades. The moving body 29 is arranged around the stationary body 28 so as to move axially under the action of a command from the actuator. The actuator in the present invention advantageously comprises an annular control cylinder made up of its rod moving relative to a stationary cylinder secured to the stationary case 15.

Each radial shaft 12 is kept in its passage 53 using a rotational guide bearing 25 arranged in the case 9. This bearing 25 is a smooth bearing comprising an inner ring 30 and an outer ring 32. The latter is secured to the cylindrical case 9, and in particular, in the flange 21. The inner ring 30 is mounted secured to the radial shaft and advantageously by hooping. A cap 33 making it possible to support the rolling guide bearing is mounted on each radial shaft 12 and is fastened on the flange 21 of the case 9 using appropriate fastening means. The oil enclosure 23 also extends below the cap 33 of the rolling guide bearing. In particular, this enclosure 23 makes it possible to contain the air charged with oil present in certain locations of the turbine engine. This oil is used to lubricate and cool the load transfer bearing 34. This oil is projected by the rotating parts of the pitch change system and forms an oil mist.

Figure 5:
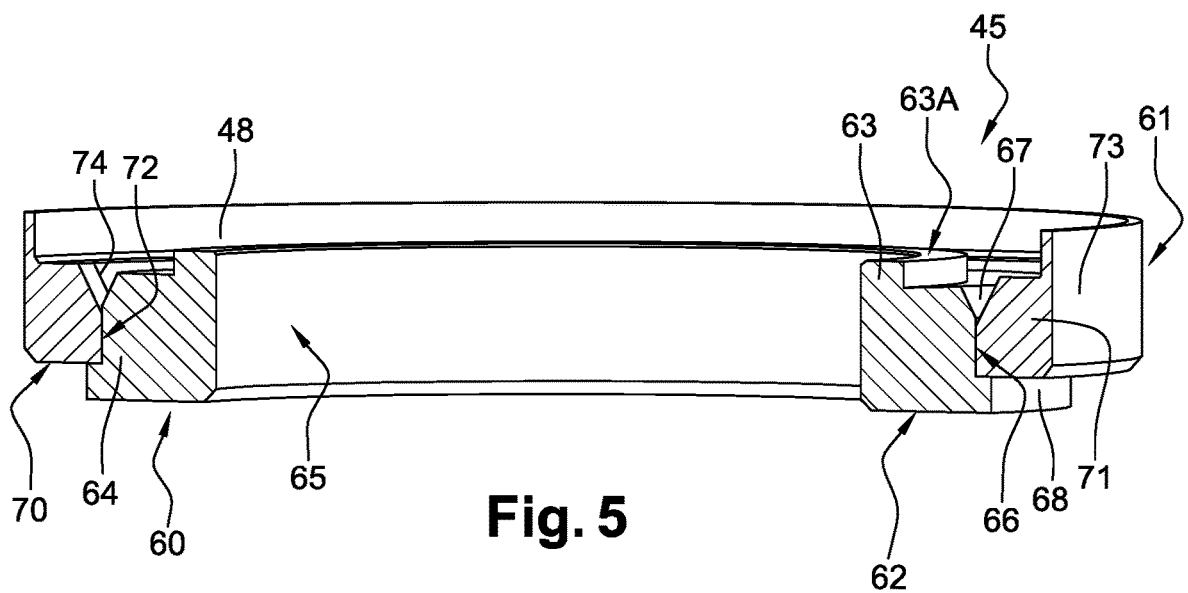
FIG. 5 is a perspective and axial sectional view of one example of an annular oil guiding device according to the present disclosure.
Figure 6:
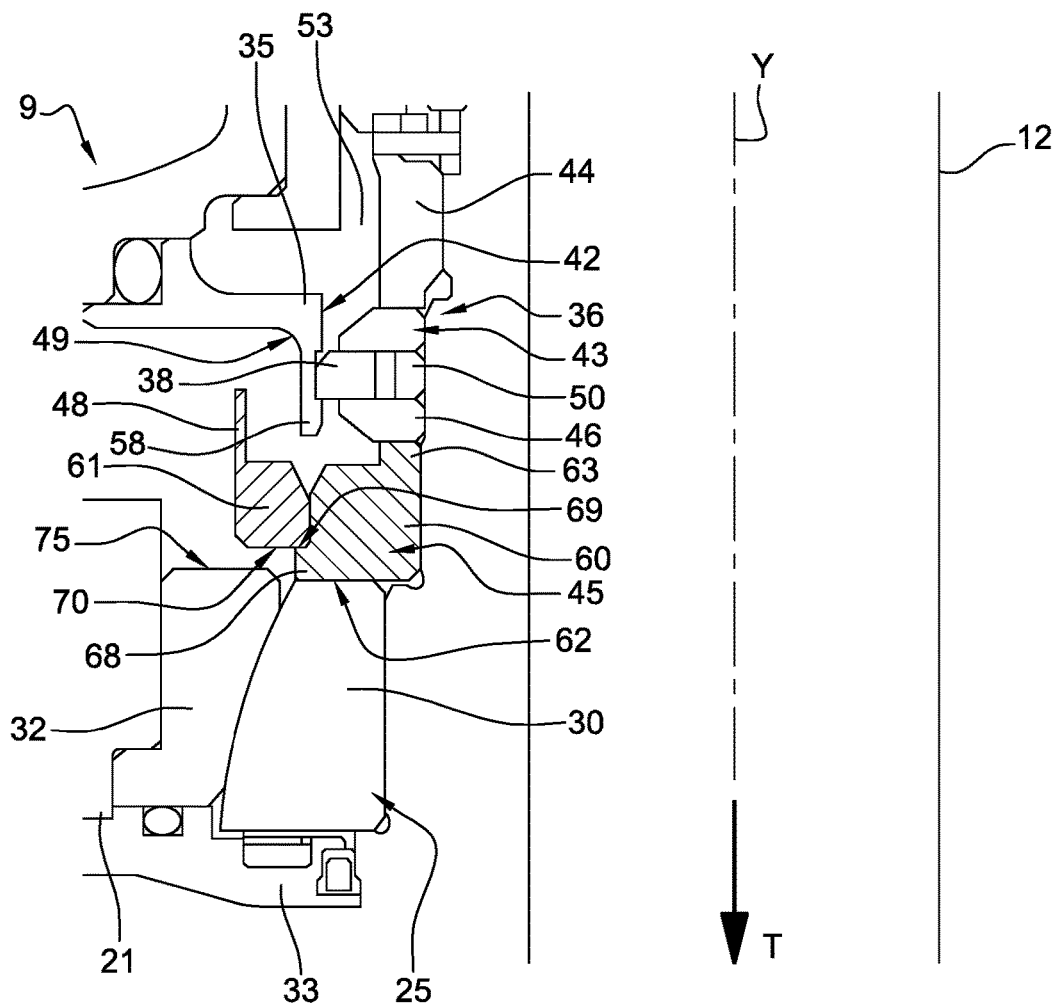
FIG. 6 is a schematic partial and axial sectional view of a radial shaft on which an annular guiding device is mounted between sealing means and a rotational guide bearing according to the present disclosure.
Figure 7:
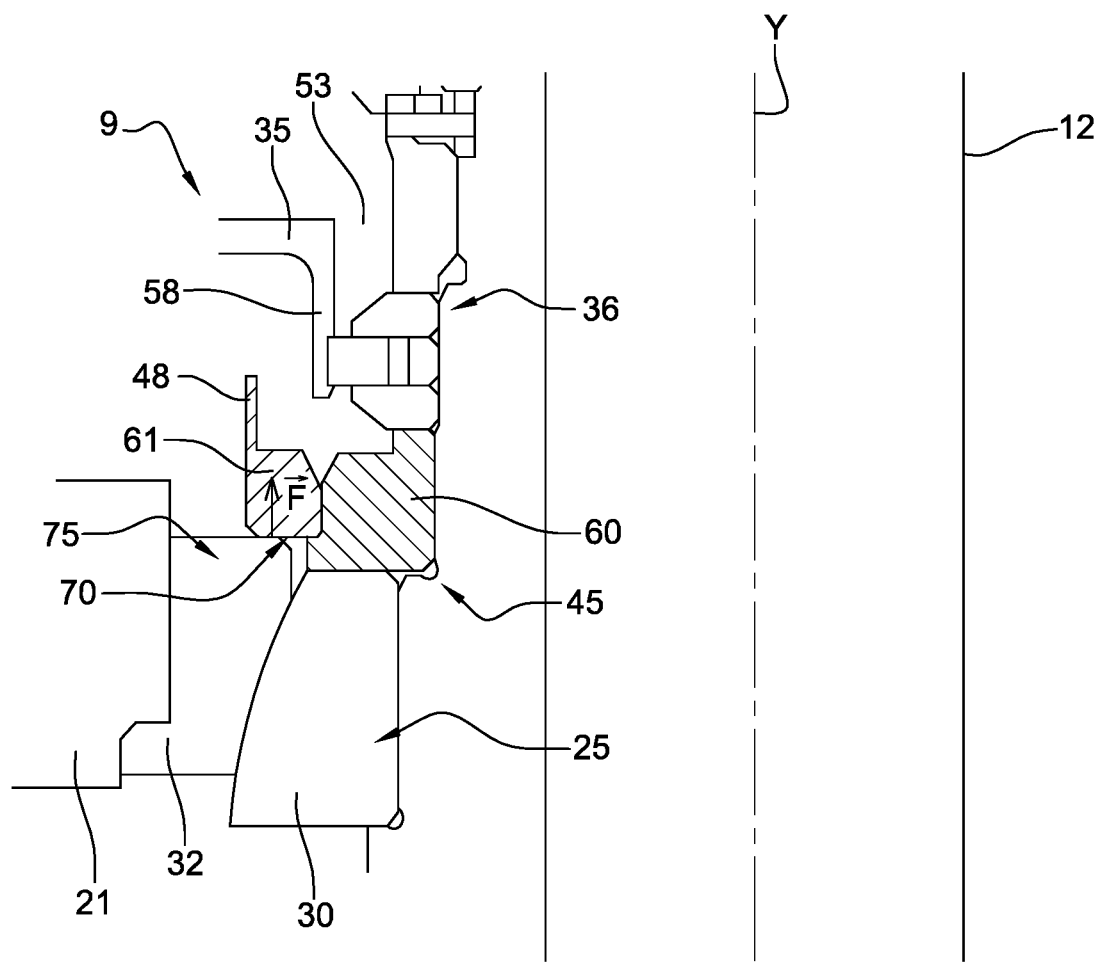
FIG. 7 shows one step of the method for removing a radial shaft from the turbine machine according to the present disclosure.

In reference to FIGS. 5, 6 and 7, the turbine engine comprises sealing means 36 that are arranged between the radial shaft 12 and a peripheral edge 35 of the radial passage 53 so as to guarantee, on the one hand, sealing between the ventilation duct 22 and the hot air circulating in the structural arms 54, and on the other hand, the risks of oil leaking toward the primary air duct 20. The turbine engine generally comprises an annular oil guiding device 45 mounted on the radial shaft 12 and also making it possible to perform a sealing function with respect to any oil leakage risks. The oil guiding device 45 may make it possible to strengthen and secure the sealing function of the sealing means, in particular in case of failure thereof.

The annular oil guiding device 45 is mounted above the rotational guide bearing 25. It makes it possible to support the sealing means 36. In other words, the device 45 is radially blocked between the sealing means 36 and the rotational guide bearing 25. In one alternative embodiment that is not shown, the annular oil guiding device 45 is not topped by sealing means. In this case, the device 45 is mounted on the guide bearing 25 and is not maintained in the upper part. Optionally, a gripping means GP may top the guide device such that the guide device is mounted radially between the bearing 25 and the gripping means.

The annular oil guiding device 45, more precisely illustrated in FIG. 5, extends around the radial shaft 12. The latter comprises a first annular part 60 secured to the radial shaft 12 and a second annular part 61 supported by the first part 60. In particular, the first part 60 and the second part 61 are nested in one another and are secured to one another. Advantageously, the first part and the second part are secured by hooping. The hooping makes it possible to keep the second part 61 on the first part 60 irrespective of the temperature prevailing in their environment. The second part 61 is configured so as to separate automatically or self-unhoop from the first part 60 under the action of a force exerted on the second part so as to allow the disassembly of the radial shaft 12 and its reassembly if necessary without tools.

The first annular part 60 comprises a lower face 62 and a radially opposite upper face 63A that are defined each in a plane perpendicular to the radial axis Y. The lower face 62 is in contact with the ring 30 of the bearing 25. The upper face 63A is supported by an upper cylindrical step 63. The latter forms a stop and is intended, here, to form a first sealing element of the sealing means 36 described later in the present description. The first part 60 has a cylindrical wall 64 extending along the radial axis Y with an inner cylindrical surface 65 and an outer cylindrical surface 66 axially opposite one another. The inner cylindrical surface 65 is secured to the radial shaft 12. In particular, the first part 60 is mounted, preferably, by hooping on the radial shaft 12. The cylindrical wall also includes a disassembly bevel 67 adjacent to the outer cylindrical surface 66 and in the upper part thereof. This bevel 67 is oriented toward the second part 61. The first part 60 further comprises a cylindrical support step 68 extending in a plane perpendicular to the radial axis Y. This step 68 is formed by a shoulder that extends from the outer cylindrical surface 66. The step 68 has a support surface 69 that is oriented upward. The step 68 sustains or supports at least part of the second part 61 so as to block any movement of the second part 61 along the radial axis Y, and in particular toward the longitudinal axis X.

The second annular part 61 comprises a lower surface 70 defined in a plane perpendicular to the radial axis Y. A portion of the lower surface 70 is in contact with the support face 69 of the first part. This lower surface 70 is also positioned at least partly across from an upper edge 75 of the outer ring 32 of the bearing 25. A space is formed between the upper edge 75 and the lower surface 70. The second part 61 comprises a cylindrical wall 71 extending along the radial axis Y with an inner cylindrical face 72 and an outer cylindrical surface 73 axially opposite one another. The inner cylindrical face 72 is in contact with and secured by hooping to the outer cylindrical surface 66 of the first part 60. The cylindrical wall 71 of the second part 61 also includes a disassembly bevel 74 that is oriented toward the first part 60, and is more specifically arranged across from the bevel 67 of the first part 60. The second part 61 comprises an annular rim 48 extending radially outward relative to the longitudinal axis X. This annular rim 48 is provided in the upper part of the cylindrical wall 71 of the second part 61. The annular rim 48 extends around the peripheral edge 35 and coaxially to this peripheral edge 35. More specifically, the rim 48 is arranged across from an outer cylindrical surface 49 of a cylindrical rim 58 of the peripheral edge 35. In other words, the rim 48 makes it possible to cap the cylindrical rim 58 and thus to protect the sealing means 36.

The first part 60 and the second part 61 are made from a metal material. To reinforce the hooping of the second part 61 on the first part 60 during the operation of the turbine engine, the metal materials are advantageously different. In particular, the material of the first part 60 has an expansion coefficient higher than that of the material of the second part 61 such that during operation, the expansion of the material of the first part 60 grips the hooping. In the present example, the first part 60 is made from Inconel®, which has good resistance to high temperatures. Inconel® has a thermal expansion coefficient of about $1.22 \cdot 10^{-5} K^{-1}$. Conversely, the second part 61 is made from a stainless steel material of type 17-4 PH. This 17-4 PH stainless steel has a thermal expansion coefficient of about $1.14 \cdot 10^{-5} K^{-1}$. It is of course possible to provide other materials for these first and second parts 60, 61 with similar characteristics, in particular characteristics of withstanding high temperatures. The annular oil guiding device 45 is advantageously an oil deflector.

Figure 8:
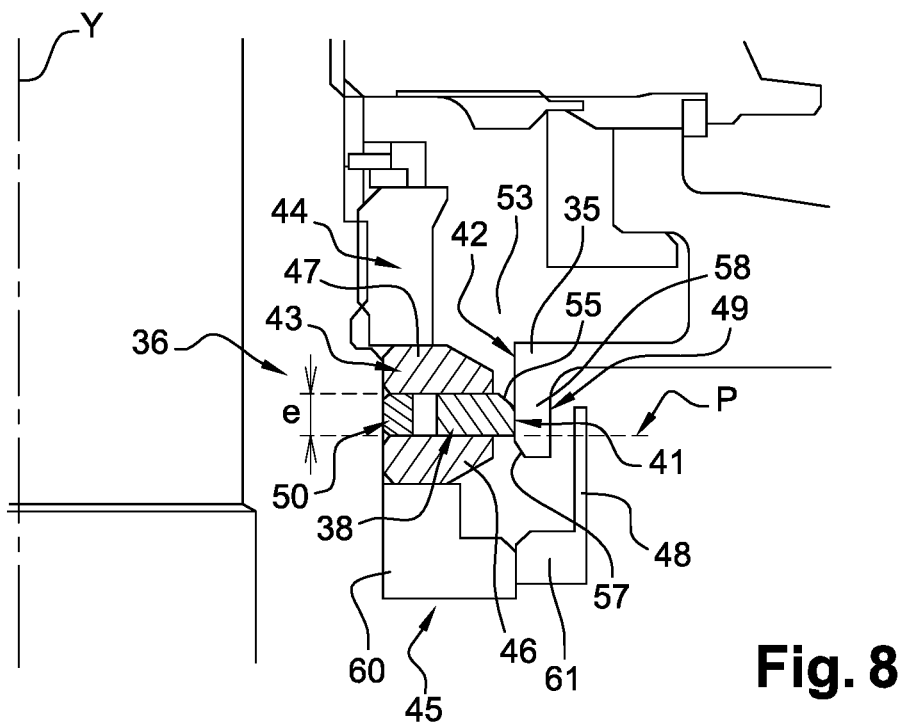
FIG. 8 is an example of the assembly of sealing means installed on a shaft with a radial axis of the turbine engine according to the present disclosure.
Figure 9:
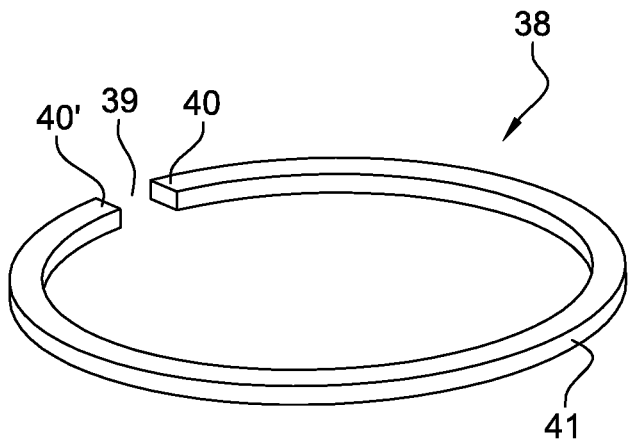
FIG. 9 schematically shows an example annular segment of the sealing means according to the present disclosure.

In reference to FIGS. 8 and 9, the first element of the sealing means 36 here is an open annular segment 38 surrounding the radial shaft 12. This annular segment 38 is mounted sliding in a plane P substantially perpendicular to the axis Y. The segment 38 has a rectangular radial section and comprises an angular opening 39 forming two opposite ends 40, 40' across from one another. The segment 38 has a face 41 abutting or bearing against an inner cylindrical surface 42 of the cylindrical rim 58. This inner cylindrical surface 42 is axially opposite the outer cylindrical surface 49 of the cylindrical rim 58. This is due to the fact that the segment 38 is mounted constrained in the plane P. In particular, the sealing means 36 comprise maintaining means 43 between which the annular segment 38 is installed. The maintaining means 43 are installed radially between a fastening means 44 supported by the radial shaft 12 and the device 45. The maintaining means 43 comprise a first annular ring 46 and a second annular ring 47 or glasses arranged on either side of the annular segment 38. The first ring 46 has an outer surface in contact with the upper face 63A of the upper part 63 forming a stop of the device 45. This upper cylindrical part 63 makes it possible to support the first ring 46 while providing a functional play necessary for the radial movement of the sealing means 36. The first and second rings 46, 47 each include a central orifice allowing them to be assembled on the radial shaft 12. The second ring 47 has an outer surface in contact with the fastening means 44.

The first and second rings 46, 47 have a surface roughness comprised between 0.2 and 0.4 µm in order to allow the segment 38 to move in the plane P. Preferably, but non-limitingly, this surface roughness is provided on the inner surfaces of the first and second rings 46, 47, which are arranged across from one another. These first and second rings are advantageously made from a metal material to guarantee maximum sealing. The segment 38 has a thickness e comprised between 10 and 15 mm.

In order to allow easy assembly within the cylindrical case, the annular segment 38 comprises a bevel 55 adjacent to the face 41. This bevel is arranged across from the inner cylindrical face 42 of the cylindrical rim 58 of the peripheral edge 35. To the same end, the peripheral rim 35 comprises a bevel 57 adjacent to the inner cylindrical surface 42 and across from the segment 38. As shown in FIG. 8, a spacer 50 is arranged between the first and second rings 46, 47 so as to space them apart. In particular, this spacer 50 makes it possible on the one hand to keep the first and second rings 46, 47 in position, and on the other hand to very minutely monitor the travel or movement of the segment 38 between the first and second rings 46, 47. The spacer 50 is annular and here has a substantially rectangular radial section. It also has a thickness substantially greater than that of the annular segment 38. The spacer 50 is also made from a metal material with the aim of guaranteeing maximal sealing. In order to guarantee resistance to the forces experienced by the radial shaft 12, the segment 38 is made from cast iron.

In the present example, the fastening means 44 is a nut that allows the tightening of the first and second rings 46, 47, the spacer 50 and the segment 38 on the oil deflector 45.

Thus, owing to the oil deflector 45, and optionally sealing means, the air charged with oil is confined in the oil enclosure 23. This avoids the pollution of the adjacent parts or elements and the proper operation thereof on the one hand, and the fire risks that may be caused by leaks, in particular during the movement of the radial shafts 12, on the other hand.

In this illustrated example, the outer diameter of the second part 61 is greater than the outer diameter of the first part 60. Likewise, the outer diameter of the second part 61 is greater than the inner diameter of the outer ring 32. It should also be noted that the inner diameter of the member 32 (here, the outer ring 32 of the bearing 25) is substantially larger than the outer diameter of the first part 60. As we can also see in FIG. 6, the second part 61 of the device 45 has an inner diameter that is substantially greater than the outer diameter of the first element of the sealing means (here the segment 38). Likewise, the outer diameter of the segment 38 is smaller than the inner diameter of the outer ring 32. This configuration allows easy removal of the radial shaft 12 from the passage 53 while maintaining the physical integrity of these different elements/members.

The invention also relates to a method for assembling a turbine engine as mentioned above. The assembly method comprises the following steps:

assembling, on the radial shaft 12, the fastening means 44, the sealing means 36, the annular oil guiding device 45 (here the oil deflector), the inner ring 30 of the guide bearing 25, and the cap 33 intended to support the guide bearing 25;

inserting the radial shaft 12 thus equipped into the passage 53 of the cylindrical case 9; and fastening the cap 33 on the cylindrical case 9 using appropriate fastening members.

The device 45 is located, once the shaft 12 is inserted and assembled, in the ventilation duct 22.

Figure 10:
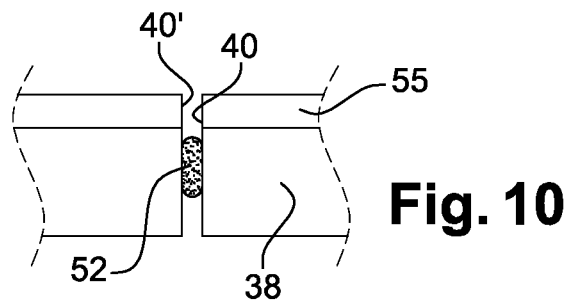
FIG. 10 schematically shows a partial front view of the constrained annular segment of the sealing means according to the present disclosure.

During the assembly of the sealing means 36 around the radial shaft 12, the method comprises the following steps:

pre-stressing the annular segment 38 while keeping the two ends 40, 40' of the segment 38 close together with a fusible means 52 as shown in FIG. 10; this fusible means is therefore made at the angular opening and between the two ends. Thus, the segment 38 is kept closed in its most constrained form. In other words, the segment is completely closed.

inserting the pre-stressed segment 38 around the radial shaft 12; and causing the breaking of the fusible means 52 such that the segment 38 bears against the inner cylindrical surface 42 of the cylindrical rim 58 of the peripheral edge 35 of the cylindrical case 9.

In the step consisting of causing the breaking of the fusible means 52, the breaking is caused during the startup of the turbine engine. Advantageously but non-limitingly, the fusible means 52 is configured, in the present example, to break at a predetermined temperature or "flash point". This predetermined temperature is greater than or equal to 100° C. Thus, when the turbine engine is started up, i.e., from the first rotation of the turbine engine, the fusible means 52 breaks so as to free the ends 40, 40' of the annular segment 38 abutting against the inner cylindrical surface of the peripheral edge of the cylindrical case 9. During operation, the stiffness of the segment 38 ensures the sealing with the inner cylindrical surface 42 of the peripheral edge and the centrifugal force ensures the sealing with the first and second rings 46, 47.

The fusible means 52 in the present example is an adhesive or glue with a flash point. The flash point refers to a condition under which the adhesive no longer performs its functions. Here, this involves the temperature above or equal to 100° C. Advantageously, but non-limitingly, the adhesive comprises a cyanoacrylate-based composition. An example cyanoacrylate adhesive is known under the name Cyanolite®.

The invention also relates to a method for disassembling the turbine engine, and in particular the radial shaft 12 for maintenance thereof or the replacement of one of the members assembled on the radial shaft 12. The method for disassembling the radial shaft 12 comprises the steps consisting of moving the radial shaft 12 radially inward with respect to the longitudinal axis X (the radial shaft 12 is pulled downward along arrow T (cf. FIG. 6) of the turbine engine so as to remove it from the turbine engine. During the radial movement T, a force is applied on the radial shaft 12. The movement and removal of the radial shaft 12 simultaneously causes the extraction of the first part 60 of the device 45 secured to the radial shaft 12 and the separation of the second part 61 from the first part 60. The inner ring 30 of the bearing 25 of the radial shaft 12, also secured to the radial shaft, is extracted during the removal of the radial shaft 12. The outer diameter of the first part 60 and the outer diameter of the sealing segment 38 being smaller than the inner diameter of the outer ring 32 of the bearing 25, this makes it possible to facilitate the passage of the first part 60 and the segment 38 still assembled on the radial shaft 12 through the outer ring 32. The removal of the radial shaft 12 is also made easier due to the fact that the outer diameter of the segment 38 is smaller than the inner diameter of the second part 61.

During the radial movement of the radial shaft 12 inward, the second part 61 abuts or bears against the outer ring 32 of the guide bearing forming the stop. A force F (cf. FIG. 7) opposite the force applied on the radial shaft 12 is thus exerted on the second part 61 so as to separate it from the first part 60. This force F is oriented along the radial axis Y. The force F is in particular applied on and toward the lower surface 70 when the second part 61 abuts against the upper edge 75 of the stop-forming outer ring 32. The separation (unhooping) is also allowed due to the fact that the resistances of the mechanical connection (hooping) between the cylindrical case 9 and the outer ring 32 are greater than the resistances of the mechanical connection (hooping) between the first and second parts 60, 61.

Following the removal of the radial shaft 12, the second part 61 rests on the outer ring 32 of the rotational guide bearing 25, which is still secured to the flange 21 of the case 9. To extract the second part 61 from the passage 53 of the cylindrical case, the outer ring 32 of the bearing 25 is separated from the cylindrical case. To that end, an extraction device (not shown) makes it possible to dislodge or extract the outer ring 32 from its location. The passage 53 is thus freed, and the second part 61 itself falls by gravity through the passage 53.

Thus, the second part 61 of the device 45 is separated from the first part and extracted from the passage 53 of the cylindrical case with no outside tools.

While illustrative embodiments have been illustrated and described, it will be appreciated that various changes can be made therein without departing from the spirit and scope of the invention.

The embodiments of the invention in which an exclusive property or privilege is claimed are defined as follows:

1. A turbine engine provided with a longitudinal rotation axis, the turbine engine comprising a radial shaft with a radial axis said radial shaft forming part of a pitch change system for blades of a propeller, said radial shaft traversing a radial passage of a cylindrical case around the longitudinal rotation axis, and wherein the turbine engine further comprises an annular oil guiding device that extends around the radial shaft, said annular oil guiding device comprising a first annular part and a second annular part nested in one another and secured to one another by hooping, the first part being secured by hooping to the radial shaft and the second part being configured to be separated from the first part by a force oriented along the radial axis and exerted on the second part by a member of the turbine engine forming a stop during a radial movement of the radial shaft.

2. The turbine engine according to claim 1, wherein the first part passes through the member, an inner diameter of the member of the turbine engine being larger than an outer diameter of the first part.

3. The turbine engine according to claim 1, wherein the first part comprises a cylindrical support step extending in a plane perpendicular to the radial axis, said cylindrical support step at least partly supporting the second part to block movement of the second part along the radial axis toward the longitudinal rotation axis.

4. The turbine engine according to claim 1, wherein the first part includes an outer cylindrical face in contact with an inner cylindrical surface of the second part.

5. The turbine engine according to claim 1, wherein the first part comprises a first disassembly bevel, and the second part comprises a second disassembly bevel, the first and second disassembly bevels being oriented across from one another.

6. The turbine engine according to claim 1, further comprising a rotational guide bearing of the radial shaft keeping the radial shaft in said radial passage, the rotational guide bearing including an inner ring secured by hooping to the radial shaft and an outer ring secured to the cylindrical case, the outer ring forming the member of the turbine engine that applies the force on the second part of the annular oil guiding device.

7. The turbine engine according to claim 1, wherein the annular oil guiding device is mounted radially at least partly between sealing means and the member of the turbine engine, and the second part of the annular oil guiding device has an inner diameter that is larger than an outer diameter of a first element of the sealing means.

8. The turbine engine according to claim 1, wherein the second part comprises an annular rim extending radially outward relative to the longitudinal rotation axis and at least part of which is across from an outer cylindrical surface of a cylindrical rim of a peripheral edge.

9. The turbine engine according to claim 1, wherein the pitch change system comprises a connecting mechanism connected to one of the blades via the radial shaft with a radial axis and a control means acting on the connecting mechanism.

10. A method for disassembling a turbine engine according to claim 1, wherein during the disassembly of the radial shaft, the method comprises:
- moving the radial shaft radially with respect to the longitudinal rotation axis to simultaneously remove the first part of the annular oil guiding device;
- causing, during the movement of the radial shaft, a separation of the second part from the first part under the force oriented along the radial axis and exerted on the second part by the member of the turbine engine, and
- removing said member of the turbine engine from the radial passage.

* * * * *